United States Patent
Martin et al.

(10) Patent No.: US 11,306,840 B2
(45) Date of Patent: Apr. 19, 2022

(54) SWITCHED NOZZLE VALVE

(71) Applicant: The Penn State Research Foundation, University Park, PA (US)

(72) Inventors: Christopher R. Martin, Hollidaysburg, PA (US); Todd D. Batzel, Duncansville, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/638,656

(22) PCT Filed: Aug. 24, 2018

(86) PCT No.: PCT/US2018/047877
§ 371 (c)(1),
(2) Date: Feb. 12, 2020

(87) PCT Pub. No.: WO2019/040826
PCT Pub. Date: Feb. 28, 2019

(65) Prior Publication Data
US 2021/0131577 A1  May 6, 2021

Related U.S. Application Data

(60) Provisional application No. 62/549,658, filed on Aug. 24, 2017.

(51) Int. Cl.
*F16K 31/06* (2006.01)
*G05D 7/06* (2006.01)
(Continued)

(52) U.S. Cl.
CPC .......... *F16K 21/00* (2013.01); *F16K 31/0648* (2013.01); *F16K 31/0655* (2013.01);
(Continued)

(58) Field of Classification Search
CPC .. F16K 31/06; F16K 31/0648; F16K 31/0658; F16K 31/0662; F16K 31/0665;
(Continued)

(56) References Cited

U.S. PATENT DOCUMENTS 4,253,480 A    3/1981  Kessel et al.
4,945,945 A *  8/1990  Schmid .................. F16K 15/04
                                          137/512
(Continued)

OTHER PUBLICATIONS

Daugherty, Fluid Mechanics with Engineering Applications 1985, McGraw Hill, 8th Edition, pp. 277-279.*
(Continued)

*Primary Examiner* — Matthew W Jellett
(74) *Attorney, Agent, or Firm* — Dinsmore & Shohl LLP

(57) ABSTRACT

A switched nozzle valve (SNV) for gas flow regulation includes a nozzle and a valve element. The nozzle includes an orifice with a fixed cross-section and a converging section converging towards the orifice for achieving sonic velocity of the gas in the orifice. The valve element is movable between a fully closed position seated on the nozzle at a valve seat and a fully open position spaced from the valve seat. The SNV further includes a control for controlling an operator for switching the valve element between the fully open and fully closed positions at a switching frequency by using a pulse-width-modulation (PWM) signal to regulate a time-averaged flow of the gas.

12 Claims, 7 Drawing Sheets

(51) Int. Cl.
    *F16K 21/00* (2006.01)
    *G05D 11/13* (2006.01)
(52) U.S. Cl.
    CPC ...... *F16K 31/0658* (2013.01); *F16K 31/0662* (2013.01); *G05D 7/0635* (2013.01); *G05D 11/13* (2013.01); *F16K 31/0693* (2013.01)
(58) Field of Classification Search
    CPC ... F16K 31/0693; G05D 7/0635; G05D 11/13
    See application file for complete search history.

(56) References Cited

U.S. PATENT DOCUMENTS

| | | | | |
|---|---|---|---|---|
| 5,165,655 A | * | 11/1992 | Drexel | F16K 1/14 137/901 |
| 5,474,100 A | * | 12/1995 | Nishijima | G05D 16/2013 137/544 |
| 5,579,244 A | * | 11/1996 | Brown | G05D 16/2053 700/301 |
| 5,785,297 A | * | 7/1998 | Ha | F16K 31/0665 251/129.14 |
| 5,791,531 A | * | 8/1998 | Hassler, Jr. | B05C 5/001 222/504 |
| 5,927,275 A | * | 7/1999 | Loser | A61M 16/205 128/205.24 |
| 6,016,832 A | | 1/2000 | Vars et al. | |
| 6,068,010 A | * | 5/2000 | Reinicke | B64G 1/26 137/1 |
| 6,886,801 B2 | * | 5/2005 | Hallback | F16K 31/082 251/129.15 |
| 7,216,528 B2 | * | 5/2007 | Gamache | F16K 7/14 137/240 |
| 8,104,506 B2 | * | 1/2012 | Gamache | F16K 7/14 137/597 |
| 8,684,036 B1 | * | 4/2014 | Satoda | F16K 1/14 137/625.33 |
| 9,109,715 B2 | * | 8/2015 | Krishnan | F16K 31/0658 |
| 2007/0012171 A1 | | 1/2007 | Schmidt et al. | |
| 2013/0152568 A1 | | 6/2013 | Modderno et al. | |
| 2014/0329156 A1 | | 11/2014 | Mathie et al. | |

OTHER PUBLICATIONS

International Search Report dated Oct. 25, 2018; International Application No. PCT/US2018/047877.

Sardelitti, et al., Proportional Mechanical Ventilation Through PWM Driven On/Off Solenoid Valve, 32nd Annual International Conference of the IEEE EMBS, Buenos Aires, ARgentina, Aug. 21-Sep. 4, 2010.

* cited by examiner

FIG. 9
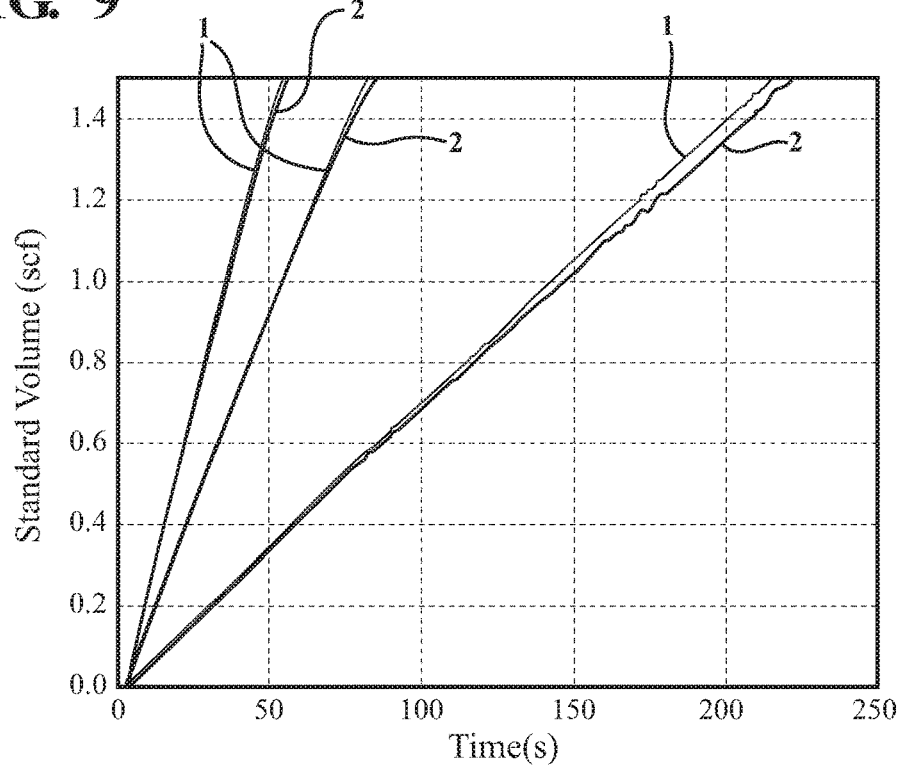
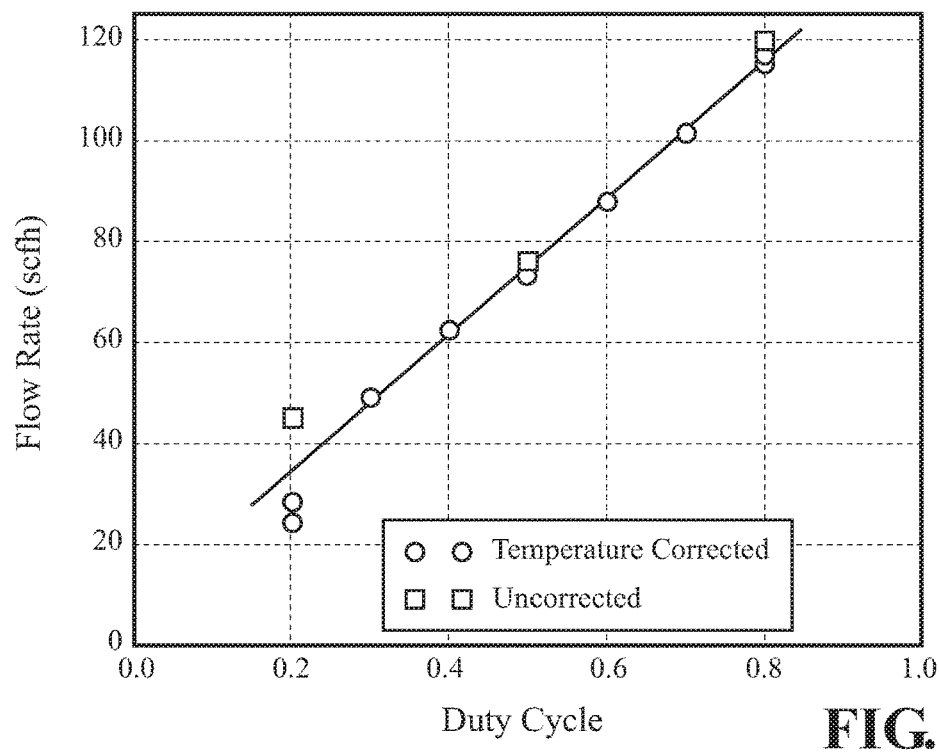
FIG. 10

SWITCHED NOZZLE VALVE

CROSS REFERENCE TO RELATED APPLICATIONS

This application is the U.S. National Stage of PCT/US2018/047877 filed Aug. 24, 2018, which claims priority to U.S. Provisional Patent Application Ser. No. 62/549,658, filed Aug. 24, 2017, the entire content of both are incorporated herein by reference.

FIELD OF THE INVENTION

The present invention relates to a switched nozzle valve for flow regulation of compressible fluids.

BACKGROUND OF THE INVENTION

In recent decades, it has been well established that adjustments in gas mixture can be an important parameter not only in welding but also in laser and plasma cutting processes; with nitrogen, argon, hydrogen, and more exotic blends appearing in standard OEM process tables.

Bottled gas blends have long been available as have on-site gas mixers, but despite the documented advantages of tunable gas mixing in welding, there are conspicuous shortcomings in the available digital controls, and tunable gas mixtures are extremely rare in cutting processes. Cutting systems require high gas pressures to provide the gas velocities essential to the cutting process, but most commercial mixer systems are inherently pressure limited.

SUMMARY OF THE INVENTION

The present invention provides a switched nozzle valve (SNV). The switched nozzle valve regulates the flow of gas by switching quickly between fully open and fully closed. The switching may be controlled using a pulse-width-modulation (PWM) scheme by precisely timing the valve's opening and closing. The geometries responsible for regulating flow can be precisely machined, and are not required to change for the valve to operate.

Since the flow rate while the valve is open is constant, the effective flow through the valve is adjusted by varying how long the nozzle is left open for each cycle. If the switching frequency is sufficiently fast, then the dynamics of the line carrying gas from the valve will tend to smooth the flow into the time average of the PWM flow in the nozzle. The PWM signals may be generated by a microprocessor or a programmed circuit. The switching maximum frequency may be at least 500 Hz or 1K Hz.

Switched nozzles do not require the flow measurement for feedback measurement and control necessary for throttling control. The turn-down ratio for a switched nozzle can be extended by reducing the switching frequency.

The SNV in accordance with the present invention can be used for digital gas mixture control, where the present valve design can be used for digital gas flow rate control for each channel of gas without a feedback measurement.

In a preferred embodiment, the SNV uses a converging-diverging nozzle with some type of method to halt flow. This might be achieved by obstructing the inlet or exit with a valve operator, or by placing the nozzle in or adjacent to a rotating body that intermittently blocks the flow passage. The converging-diverging nozzle may be conical or pyramidal, or any other shapes that are easy to manufacture and can seal well.

In one embodiment, the valve element may be a ball or any other suitable shape that can be fully closed and opened at a high frequency. The valve seat may be at the converging section, at the diverging section or in or on the orifice.

The smaller the volume between the valve seat and the orifice is, the better. Ideally, the volume between the valve seat and the orifice is 0. In the actual implementation, the fractional significance of this switching volume might be about 0.1% of the flow rate.

The present invention also provides a method of digitally regulating gas flow using a switched nozzle valve. The flow of gas flowing through the nozzle is controlled by a pulse-width-modulation (PWM) signal to achieve a time-averaged flow rate of the gas. The PWM signal may be generated by a microprocessor or a programmed circuit. The converging nozzle helps bring the gas flow to a speed of sound such that the orifice reaches a choked condition, where the pressure drop causes the orifice to be at a critical pressure, any downstream pressure is below the critical pressure and the flow rate is independent of downstream pressure. The time necessary to achieve steady-state flow conditions can be determined by the design variables such as the length of the nozzle, length of the orifice, etc.

Ideally, the gas flow in the nozzle would instantaneously transition between zero flow and choked flow.

The gas exiting the critical throat can be decelerated with a combination of a shock and conical expansion. A choked flow with a substantially smaller pressure drop can be achieved.

The switched nozzle valve of the present invention permits the metering of a variable flow rate of gas by the intermittent obstruction of a statically machined orifice. By combining a diverging nozzle with the metering orifice, the switched nozzle valve can be extended to the operable pressure range.

The switched nozzle valve provided in the present invention can be used for mixing multiple gases with digital control that eliminates the need for feedback measurements, reduces the pressure drop required for effective gas metering, and is inherently adaptable to digital control.

The switched nozzle concept represents a substantial improvement on the state of the art in gas regulation; particularly in applications requiring digital control. The intended applications can include but are not limited to: gas mixing in welding, cutting, forming, or other manufacturing applications, gas flow regulation in medical and other biological applications, and generic industrial gas flow regulation requiring digital control.

BRIEF DESCRIPTION OF THE INVENTION

FIG. 9 is a plot showing corrected standard volume of the gas in the tank for three tests;

FIG. 10 is a plot showing corrected volumetric flow rate versus duty cycle with 50 Hz forcing;

Figure 12:
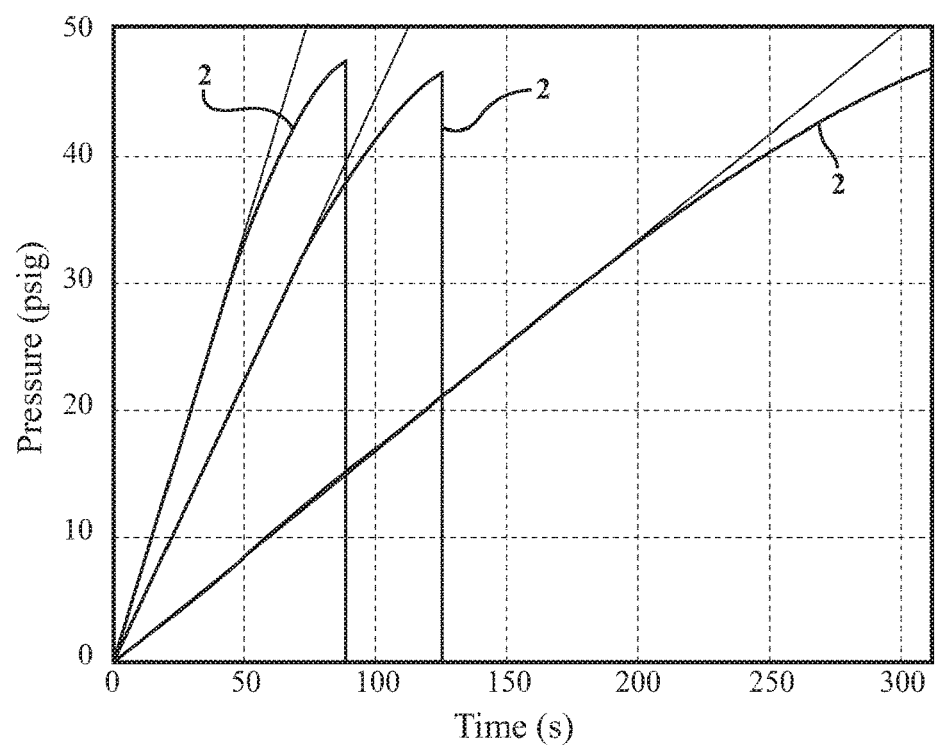
Figure 13:
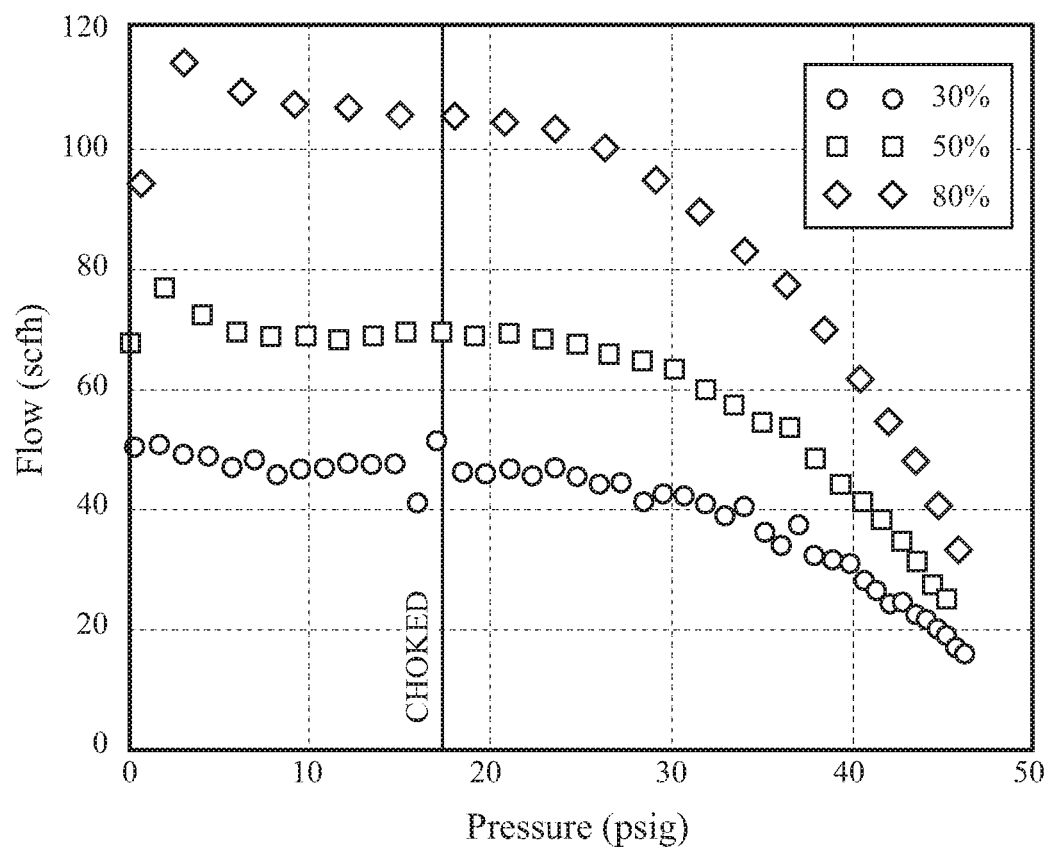

FIG. 12 is a plot showing pressure versus time for 20%, 50%, and 80% duty cycle tests; and FIG. 13 is a plot showing flow rate versus delivery pressure for three duty cycles with approximately 50 psig upstream pressure.

DETAILED DESCRIPTION OF THE INVENTION

Overview

Figure 1:
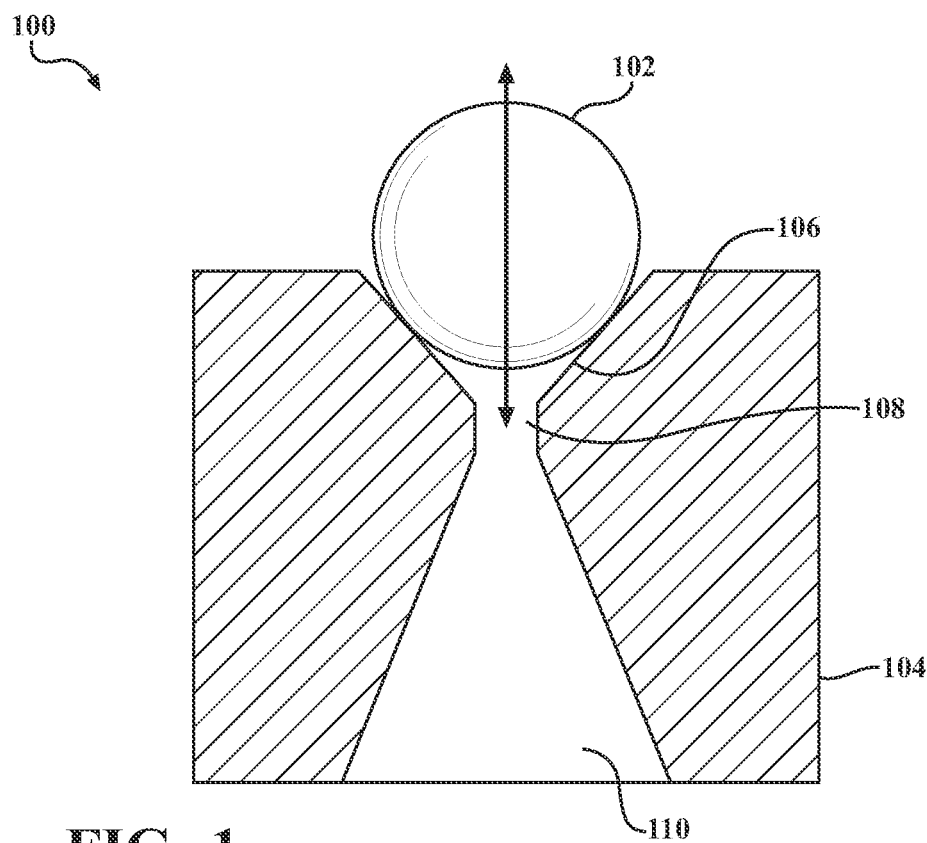
FIG. 1 is a cross-sectional view of a switched nozzle valve (SNV) in accordance with an embodiment of the present invention.

The present invention provides a switched nozzle valve (SNV). FIG. 1 illustrates a switched nozzle valve 100 in accordance with an embodiment of the present invention. The ball-shaped valve element 102 seats on a converging inlet 106 of the nozzle 104 and can be moved up and down relative to the nozzle. When the valve element is moved down, pressing on the converging inlet 106 of the nozzle 104, the valve is closed. When the valve element is moved up, the valve is open and the gas will be able to flow through the throat 108 of the nozzle and enter the diverging outlet 110 of the nozzle. The throat 108 may have a cylindrical shape. The ball-shaped valve element 102 is movable axially with respect to the throat 108.

Figure 2:
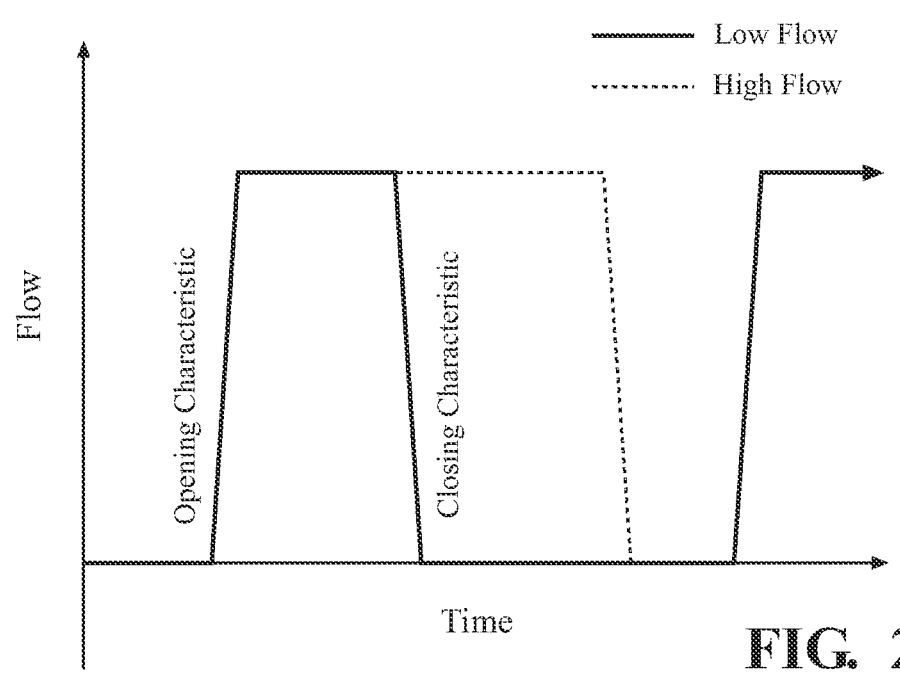
FIG. 2 is a plot showing examples of instantaneous flow versus time for a switched nozzle valve in accordance with an embodiment of the present invention.

FIG. 2 shows two ideal examples for instantaneous flow rate versus time. Since the flow rate while on is constant, the effective flow through the valve is adjusted by varying how long the nozzle is left open for each cycle. If the switching frequency is sufficiently fast, then the dynamics of the line carrying gas from the valve will tend to smooth the flow into the time average of the pulse-width-modulated (PWM) flow in the nozzle. A SNV in accordance with the present invention can be used for metering gas flows with a PWM signal generated by a microprocessor.

Most fluids flowing through an orifice will achieve a velocity determined by the pressures at work on either side, but when the fluid achieves its speed of sound, the flow transitions to a "choked" condition, wherein the flow rate is determined entirely by the upstream conditions. The downstream conditions no longer have any effect on the flow rate through the nozzle. Flow through a transonic nozzle is insensitive to the delivery condition, so it is ideal for metering a constant flow.

Based on the theory which will be described in detail hereinbelow, plain orifices require a pressure drop between 44% and 53% to achieve choked flow. A 125 psig gas supply can only be used to deliver 55 psig at the mixer exit. The upstream pressure is required to be precisely controlled or at least measured.

Figure 3:
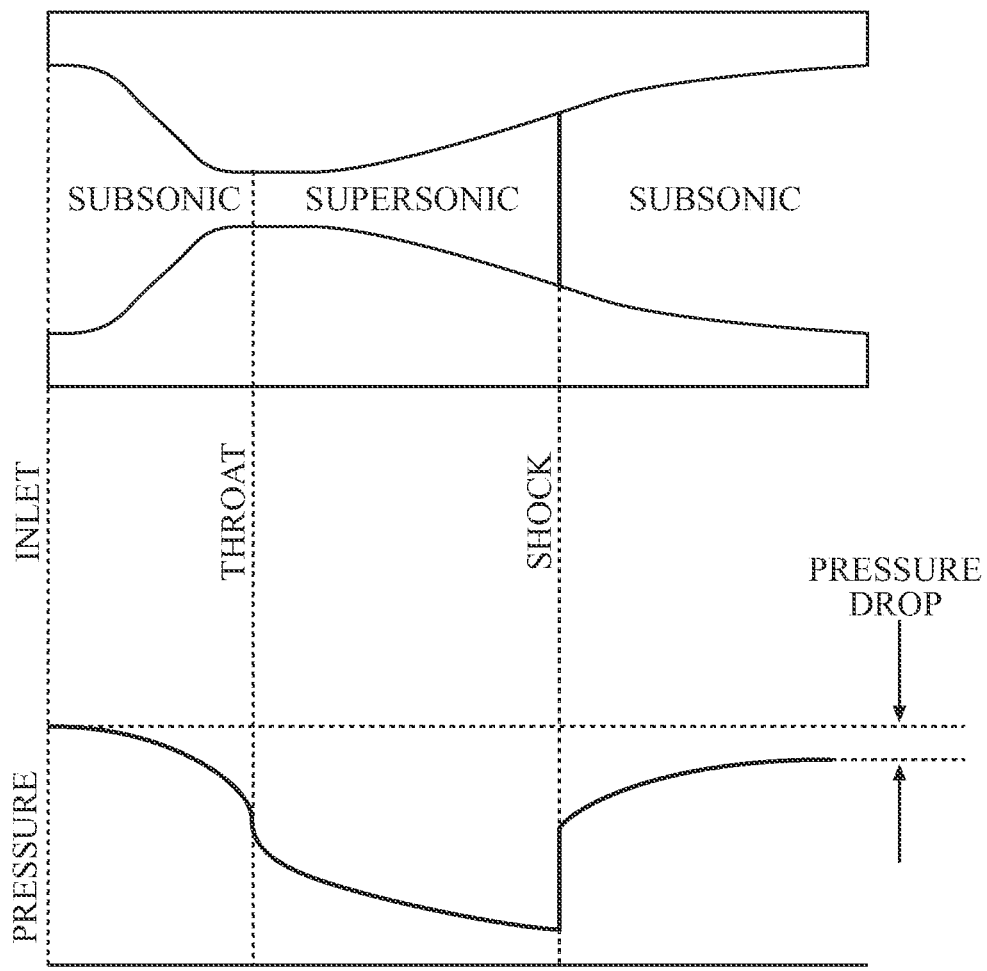
FIG. 3 is an illustration showing the converging-diverging process of a critical converging-diverging nozzle with a subsonic exit.
Figure 4:
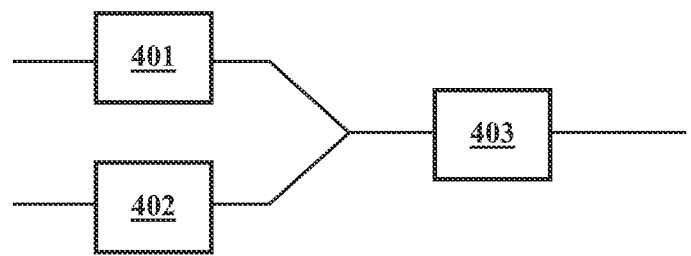
FIG. 4 is a block diagram showing using a SNV of the present invention for flow regulation at each channel of a gas mixer.

By carefully decelerating the gas downstream of a choked throat, it is possible to recover much of the pressure drop. At the discharge of a plain orifice, the momentum that was achieved at the cost of gas pressure is lost to turbulence, but if the fluid exiting the critical throat can be decelerated with a combination of a shock and conical expansion it becomes possible to achieve choked flow with a substantially smaller pressure drop. This geometry is called a converging-diverging nozzle. FIG. 3 depicts the process by which incoming gas can be accelerated in a converging section, choked in the nozzle throat, further accelerated to sonic speeds in an expansion, abruptly decelerated by a shock, and then isentropically decelerated by the remaining expansion. A plain orifice stops after the choked throat, but the addition of the conical divergence makes it possible to recover energy devoted to achieving sonic velocity in the throat.

Theory of Operation

Achieving Constant Flow

When gas flows in a nozzle are accelerated to the speed of sound, the downstream conditions no longer have any affect on the flow rate through the nozzle. Most fluids flowing through an orifice will achieve a velocity determined by the pressures at work on either side, but when the fluid achieves its speed of sound, the flow transitions to a "choked" condition, wherein the flow rate is determined entirely by the upstream conditions.

In order to achieve choked flow, the pressure in the throat of the orifice must be at the "critical" condition, $$\frac{p_0}{p^*} = \left(\frac{\gamma+1}{2}\right)^{\frac{\gamma}{\gamma-1}}. \quad (1)$$

Here, p0 is the upstream total pressure and γ is the gas specific heat ratio. For a plain orifice, any downstream pressure below p* will result in choked flow. It is important to emphasize that these equations deal in absolute units (psia), which are 14.7 psi greater than the gauge pressures typically reported (psig).

Since the momentum in a plain orifice is permanently lost to turbulence, the nozzle pressure is usually roughly equal to the downstream pressure. Most gases with broad industrial application tend to exhibit values for γ between 1.2 and 1.8. The implication is that plain orifices require a pressure drop between 44% and 53% to achieve choked flow.

If a0, p0, p0, and T0 are the upstream total speed of sound, density, pressure and temperature, and A* is the throat area, the mass flow rate will be $$\dot{m} = \rho_0 a_0 A^* \left(\frac{2}{\gamma+1}\right)^{\frac{\gamma+1}{2(\gamma-1)}} \quad (2)$$

$$= p_0 A^* \sqrt{\frac{\gamma}{RT_0}} \left(\frac{2}{\gamma+1}\right)^{\frac{\gamma+1}{2(\gamma-1)}}$$

Equation (2) reveals that the mass flow rate through a choked orifice is proportional to the upstream gas pressure Like all flow control strategies that leverage choked flow, this application requires that the upstream pressure either be precisely regulated or at least measured.

Pressure Recovery

The ideal compressible flow equations predict the relationship between pressure and the nozzle area for a well designed nozzle. For an inlet total pressure, p0, and a nozzle with throat area, A*, the pressure of a gas with specific heat ratio γ is related to area by $$\left(\frac{A}{A^*}\right)^2 = \frac{\frac{2}{\gamma-1}\left(\frac{p_0}{p}\right)^{\frac{\gamma+1}{2}}}{\left(\frac{p_0}{p}\right)^{\frac{\gamma-1}{\gamma}}-1}\left(\frac{2}{\gamma+1}\right)^{\frac{\gamma+1}{\gamma-1}} \quad (3)$$

Figure 5:
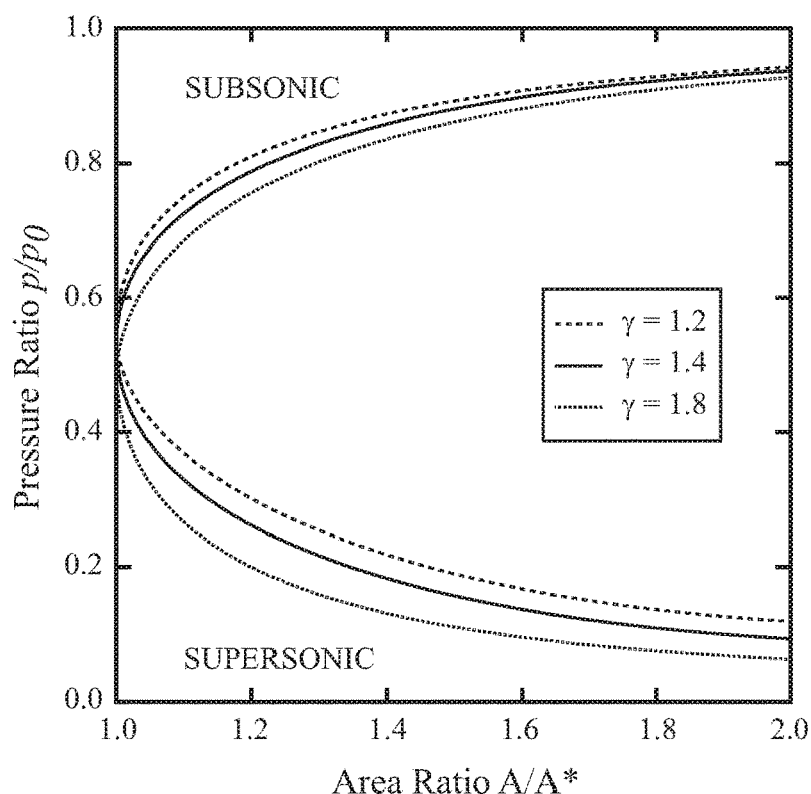
FIG. 5 is a plot showing pressure ratio versus area ratio for a transonic nozzle.

FIG. 5 shows the fractional pressure decline in ratio with the area ratio. In the converging inlet, the pressure will decline along the upper portion of the curve as the flow is accelerated, reaching p* when the area is minimum in the throat. In the diverging outlet, the flow is further accelerated to super-sonic velocities, and the pressure continues to decline along the lower portion of the curve. Until the formation of a shock wave in the exit, none of the nozzle's flow is dependent on the downstream conditions.

If we follow the sub-sonic portion of the curve predicted by Equation 3, we establish the upper bound on the pressure that could be recovered by a nozzle with a given area ratio. FIG. 5 shows the choked nozzle pressure ratio as a function of area ratio for gases with various specific heat ratios; 1.4 being typical of diatomic gases (N2, O2), and 1.2 and 1.8 representing extreme variations. For reference, monatomic gases like argon and krypton exhibit a specific heat ratio of about 1.67, and methane is about 1.3.

In most applications, the ideal compressible flow equations are quite adequate, but they fail to account for the various factors that prevent total pressure recovery. The realities of viscosity and turbulence will not allow such a thing, but the next section addresses yet another reason that such a thing is not possible.

Switching

The switched nozzle concept relies on some method to intermittently halt flow. This might be achieved by obstructing the inlet or exit with a valve operator, or perhaps placing the nozzle in or adjacent to a rotating body that intermittently blocks the flow passage. In ideal operation, the flow in the nozzle would instantaneously transition between zero flow and choked flow, but there will clearly be some transience involved. Here, we comment on four mechanisms for deviating from the ideal flow.

1) Flow Transience

In the extreme case where the exit pressure is equal to the inlet pressure, there is no favorable pressure gradient to accelerate the gases in the first place. If a tiny favorable pressure gradient is applied, gas will flow, but it will accelerate to that condition very slowly. This is a dilemma in our application; where quickly achieving steady-state flow conditions is essential.

Inspection of the transient compressible gas equations suggests that one possible scaling law for the time necessary to bring the nozzle up to choked flow could be $$t \approx \frac{Lp_0}{a\Delta p}. \quad (4)$$

Here, t, is the time required for the nozzle to reach steady flow, p0 is the inlet pressure, Δp is the pressure drop across the nozzle, L is the length of the nozzle, and a is the speed of sound in the gas. With a relatively long nozzle (2 cm) and a small pressure drop (10%), it is easy to produce millisecond time scales, but a nozzle carefully designed to be short in length can address this issue.

2) Pumping Effects

Reciprocating geometries have the potential to produce a pumping effect. The volume displaced for every stroke by a reciprocating cylindrical operator will be determined by operator cross-sectional diameter, $d_o$, and the stroke length, L. If the operator is placed upstream, the amount of gas occupied in that volume will be related to the upstream density. Finally, if we imagine that only a fraction, η of this gas is actually "pumped" downstream, we might estimate the additional mass flow due to pumping to be $$\dot{m}_p = \eta \frac{\pi d_o^2 \int \mathcal{L}p_0}{4RT_0} \quad (5)$$

If we consider air at 50 psig (3.4 bar) and 300K, an operator ¼ in (6.4 mm) in diameter operating at 100 Hz would only cyclically displace about 6.7 mg of gas every second. Meanwhile, a reasonable flow rate through the valve is three orders of magnitude higher, and only a fraction of the gas displaced would be pushed through the orifice. This effect is probably safely ignored.

3) Operator Transience

It will take some time for a reciprocating operator to transition between fully open and fully closed, during which the flow will be partially obstructed. In addition to overcoming fluid mechanical forces, the actuated force is responsible for quickly accelerating the operator through its stroke length.

If $F_{net}$ is the net actuator force, m is the operator mass, and L is the operator stroke length, then the time to open is approximately $$t = \sqrt{\frac{2\mathcal{L}m}{F_{net}}} \quad (6)$$

A 10N force acting on a 20 g operator will achieve a 0.5 mm stroke in 1.4 ms.

4) System Acoustics

It is difficult to address the effect that the acoustic response of the surrounding system may have on the valve's performance since acoustics are heavily dependent on boundary conditions. If the valve is successful in isolating flow from the downstream conditions, delivery-side (downstream) acoustics should not impact the effective flow rate. However, upstream acoustics can.

Since parameters like acoustic damping and actual boundary conditions are best assessed experimentally, methods for acoustic mitigation will be explored as necessary. One option is to adjust the switching frequency as necessary to avoid acoustic phenomena. Another option is to add anti-resonance chambers to the upstream valve geometry to suppress oscillations at key frequencies.

From these analyses, we conclude that operator and flow transience are the primary concerns for the dynamic operation of the valve. Flow transience will limit the pressure recovery performance of the valve, and the operator transience will limit the valve's performance. FIG. 5 shows how these effects might impact the shape of the individual flow pulses.

The total flow rate will be $$\bar{\dot{m}} = \frac{1}{T_s}\int_0^{T_s} \dot{m}\,dt \quad (7)$$

where $T_s$ is the switching period. If we assert that the ideal flow is $\dot{m}_{on}$ for $T_{on}$ seconds and zero for $T_{off}$ seconds, and that the actual flow deviates from the ideal by some amount, $\dot{m}_c$, then $$\bar{\dot{m}} = \frac{1}{T_s} \int_0^{T_{on}} (\dot{m}_{on} + \dot{m}_c)dt + \frac{1}{T_s} \int_{T_{on}}^{T_s} \dot{m}_c dt \qquad (8)$$

$$= \frac{T_{on}}{T_s}\dot{m}_{on} + \frac{1}{T_s}\int_0^{T_s} \dot{m}_c dt$$

$$= \frac{T_{on}}{T_s}\dot{m}_{on} + f_s m_c$$

Figure 6:
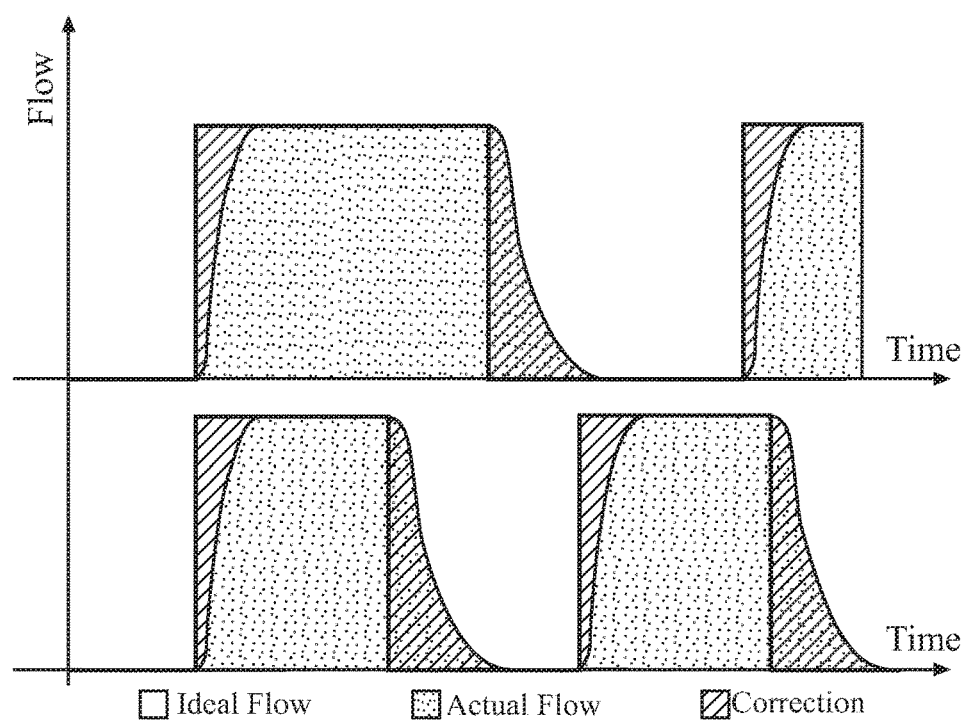
FIG. 6 is a comparison plot showing ideal versus real switched flow characteristics at two switching frequencies.

As FIG. 6 suggests, the flow correction, $\dot{m}_e$, should be zero everywhere except during the transience as the valve is opening and closing. That implies that the integral of the correction (or the hashed areas in FIG. 6) is independent of the switching frequency. This flow correction constant, $m_c$, represents the quantity of gas permitted to pass for every stroke of the valve in addition to the flow an ideal switched nozzle would allow. This number can be positive or negative, and its effect on flow should grow proportionally to the switching frequency, $f_s$.

Design

Seat Geometry

The present design values the long-term stability of the opening and closing characteristic (values for $m_c$ in Equation 8 that do not change appreciably with age) over achieving a positive seal. A valve operating at 100 Hz would cycle 8.6 million times in 24 hours and would need to endure some 15.8 billion cycles in 5 years. Elastomer seats are excellent for forming ultra-low leak seals, but the present valve's primary purpose would not be compromised if there were microscopic leaks around the operator. The present design uses a ball sealing against a conical seat.

Figure 7:
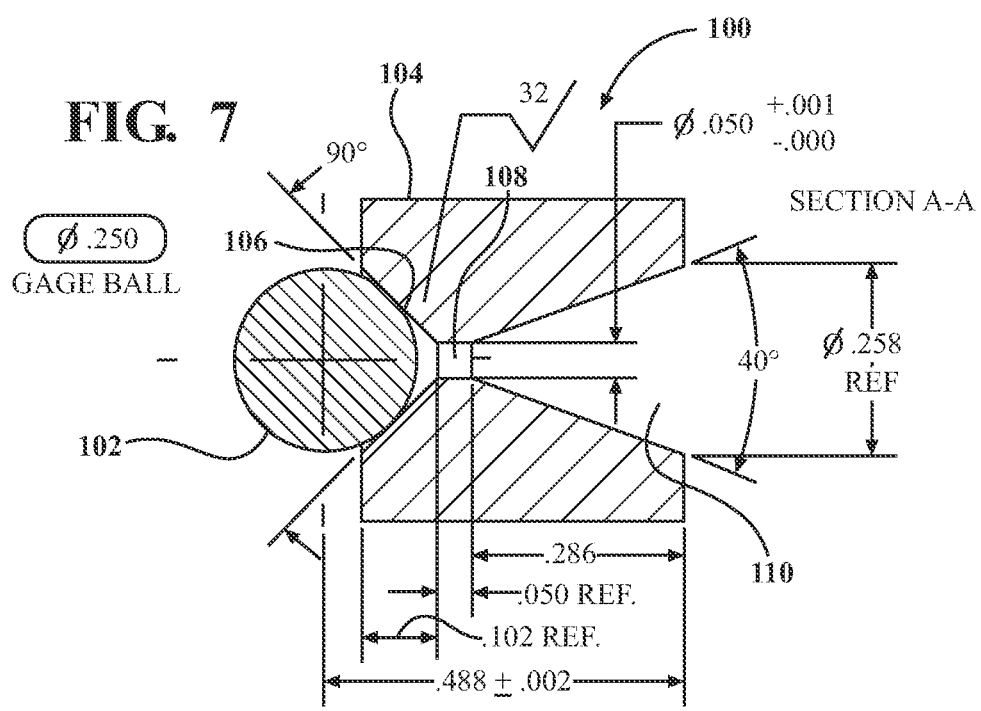
FIG. 7 is a schematic showing an exemplary design of a valve seat and a converging-diverging nozzle in accordance with an embodiment of the present invention.

Using this arrangement, the geometry of the converging-diverging nozzle is readily combined with the valve seat. The converging-diverging nozzle should nominally be machined with gentle radii and a gradual expansion to limit flow separation, but these geometries present certain difficulties for manufacturing. The SNV seat uses the conical geometry depicted in FIG. 7, which tolerates sharp edges. By combining the seat and the nozzle, the length of fluid that must be accelerated and decelerated with every stroke is reduced.

In this embodiment, the inlet cone is a 90° included angle, and the exit is a 40° included angle cone. The throat is 0.050 inches in diameter and length, and the cones open to approximately ¼ inch diameters. A ¼ inch ball is seated in a 90-degree cone.

To attain higher expectation for the life of the assembly, the ball should be made from a hard material so it will not deform over the life of the valve. Instead, the conical seat should be softer than the ball so it will conform to the ball's precise shape and diameter. There will be a brief "break-in" period during which microscopic tool marks will vanish and the conical surface will adopt a smooth finish in the ring where the ball seats in the cone.

In the prototype used for the present experiment, a ¼-inch lab-grown sapphire ball seated in a brass cone is used. Sapphire balls can be produced inexpensively at extreme precision, they are lightweight, and boast a Vickers hardness over 10 times that of stainless steels. The choice of brass was merely for convenience of machining, and would readily be replaced by stainless steels or any suitable materials in practical application.

In some other embodiments, the design of the integrated valve and nozzle may take other shapes such as a truncated pyramid, as long as the seat provides a sufficient seal.

The smaller the volume between the valve seat and the orifice is, the better. Ideally, the volume between the valve seat and the orifice is 0. In the actual implementation, this volume might be probably a few cubic mm or so. Gas quantities are often expressed in "standard" units. Neglecting temperature differences, the amount of gas contained in a volume in "standard volumetric units" is $V_o = V \ast p/p_o$ where V is the physical volume of the space the gas occupies, p is the absolute pressure (not gauge like psig), and po is the standard reference pressure (usually 1.01325 bar or about 14.5 psia). This volume will become a problem when the gas contained in the volume is a significant fraction of the flow that passes through the valve in a single cycle. If the nominal volumetric flow rate for the valve is Qn (in volume per second), then the volume that will pass through the orifice per cycle is Qn/f when f is the switching frequency. The fractional significance of switching volume becomes $V \ast p \ast f/(p_o Q_n)$. For example, V might be a few cubic mm, p might be 6 or 8 bar, f might be 50 Hz, po is close to 1, and a typical Qn might be about 60 L/min (1 L/s). So, a worst-case (with volumes converted to cubic meters) would be or about 0.1%.

It is possible to have the valve seat on the orifice (nozzle throat) itself, but it is very difficult to implement. A moving part would be needed to put inside the throat of the nozzle, and there isn't much room in there (our prototype has a throat only 0.050" in diameter). Another reason not to put the valve seat on the same geometry that meters the flow: the geometry of the nozzle throat should be static and unchanging. if it is impacted by the valve seat, it will wear as the valve ages.

For a number of reasons, having the valve seat on the up-stream (converging) section is better than on the diverging section.

1) Diverging sections cannot use a wide cone without running the risk of flow separation. The converging section does not have this limitation. The wider the cone, the smaller the distance the valve element needs to move.

2) The fluid forces upstream will tend to help the valve operate in a bi-stable mode (fully closed or fully open). If trying to fight the flow to close the valve, there is a chance that the valve can hang in-between in a throttling state, which should be avoided for the switched nozzle valve.

In another embodiment, the nozzle can be made where the orifice is in a spinning disc so that it is only intermittently exposed to flow and the rest of the time, the flow is blocked.

Operator Architecture

A number of operator architectures may be used, such as:
1) Direct-Acting Solenoid Direct acting solenoids place a ferromagnetic operator in a stationary coil with a spring biasing the operator to a preferred location. These are mechanically simple, reliable, and quite simple to construct, but their operators are quite heavy compared with the latter options.

2) Indirect-Acting Solenoid

Indirect acting solenoid valves use either piloted gas flows, or a mechanical armature to amplify force or motion to the operator. They can be quite fast, compact, and energy efficient, but they are substantially more complex than the alternatives.

3) Voice Coil Operator

Voice coil operators place a copper coil in a permanent magnetic field. The weight of the ferromagnetic material is moved to the stationary portion of the valve, and this actuator is the only one capable of bi-directional actuation (eliminating the need for a biasing spring). Because of their light weight, these are a favorite for high-frequency applications, but they require passing electrical current across a moving boundary.

Figure 8:
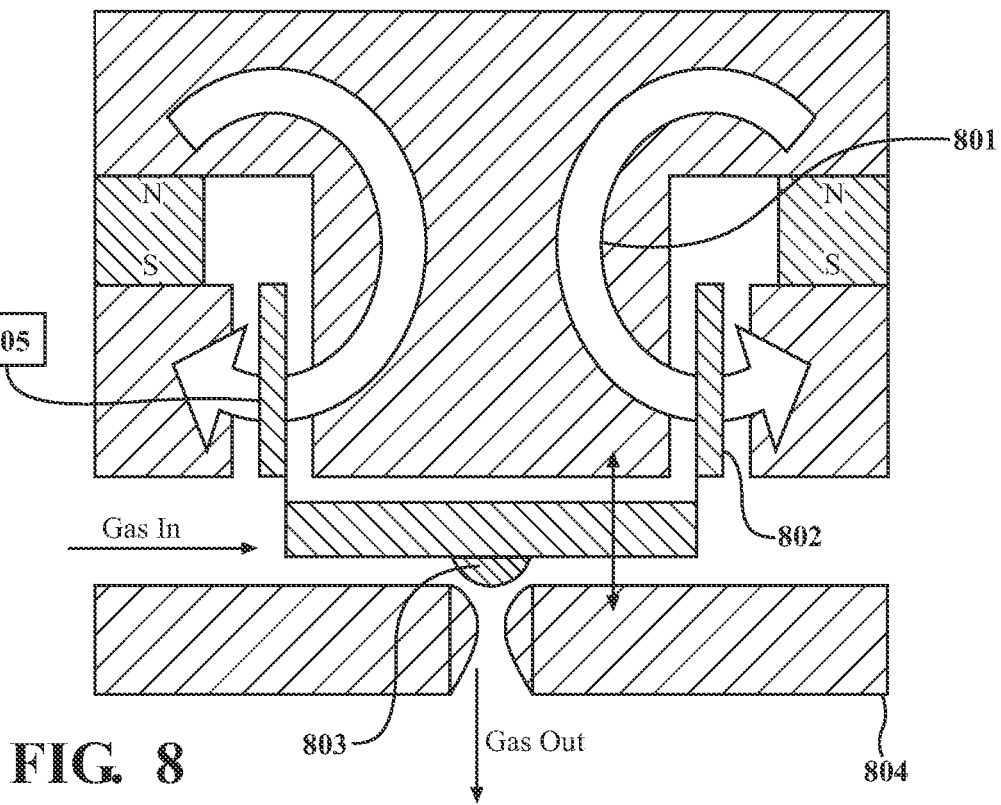
FIG. 8 is schematic showing a magnetic operator design.

For the prototype used in the present evaluation, a voice coil is used for its mechanical simplicity and to minimize the operator mass. FIG. 8 shows a cartoon representation of the voice coil 802 with the magnetic field loop 801, the seat 803, and mechanical elements 804. The voice coils are controlled by a control unit 805.

Evaluation

The prototype used for the evaluation uses a voice coil to minimize the operator mass. A neodymium ring magnet is placed between a T-shaped steel puck and a steel ring, forming an annulus with a radial magnetic field measured around 0.3 T. The sapphire ball is pressed into an aluminum yoke, and a coil of 96 winds of 20 AWG magnet wire forms a coil approximately 0.5 inches long. The valve body and casing are machined from 3-inch diameter brass. The conical seat is machined as a separate part and pressed into the valve body as shown. The operator weighs approximately 17 g, and produces more than 5N of force with 2A.

Regulation of Flow

The prototype valve was supplied with 50 psig shop air and used to fill a 5 US gallon pneumatic reservoir. The coil was driven with a 2A square wave with duty cycles between 20% and 80% at 100 Hz and below. Flow rate was determined by monitoring the reservoir pressure and temperature over the duration of the test.

The quantity of gas in the tank was calculated in standard volumetric units, which indicate the quantity of gas that would be occupied by the reported volume if the gas were at standard temperature and pressure (1.01325 bar and 0° C.). The standard volume, V°, is calculated from the physical volume, V, the measured temperature and pressure, T and p, and the standard temperature and pressure, T° and p°.

$$V^\circ = V \frac{pT^\circ}{p^\circ T} \quad (9)$$

FIG. 9 shows the calculated standard volume in the reservoir for three tests. The lines marked 1 indicate volume calculated assuming the tank is at the ambient temperature. The lines marked 2 include the gas temperature measurement for compensation.

The flow rate was determined as the slope of a linear fit of the standard volume versus time. In some tests, the pressure at the valve inlet drooped by as much as 10% due to line losses and poor regulator performance. As indicated by Equation (2), this should have a linear impact on the flow, and can be easily corrected using a ratio law $$\frac{\dot{m}}{p_0} = \frac{\dot{m}'}{p_0'} \quad (10)$$

where $\dot{m}$ and $p_0$ are the actual measured flow rate and upstream pressure, and $\dot{m}'$ and $p_0'$ are the corrected flow rate and the nominal upstream pressure (50 psig). FIG. 10 shows the results for a series of measurements. Duty cycle is defined as the ratio of time on to the total switching period. Some data were repeated while adjusting the upstream pressure to compensate for pressure drops. White squares indicate data taken with no temperature measurement in the reservoir, so ambient temperature was assumed.

The data demonstrate excellent agreement with the linear prediction of flow rate relative to duty cycle in Equation (8). Linear regression shows a 1.345 scfh/% sensitivity to duty cycle with an 8 scfh offset. The offset is attributed to the $m_c f_s$ term. Poor performance at 20% duty cycle is believed to be the first indicators of the system's acoustics impacting the flow characteristics.

Figure 11:
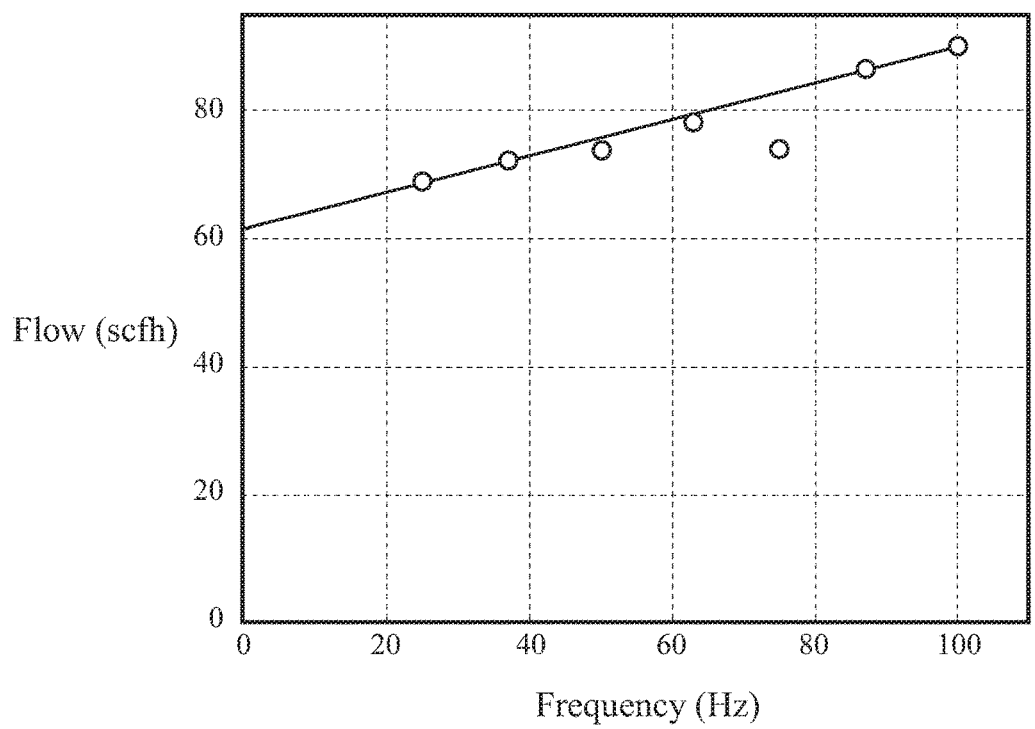
FIG. 11 is a plot showing corrected volumetric flow rate versus frequency with 50% duty cycle.

An additional study was performed while holding the duty cycle at 50% and varying the frequency. FIG. 11 shows a linearly increasing flow consistent with Equation (8) and intermittent outliers consistent with acoustic effects. The slope of the frequency effect suggests an $m_c$ value of 14.2 scfh/Hz or $7.92 \times 10^{-5}$ scf per cycle. This accounts for the offset at 50 Hz within several scfh. (scfh: standard cubic feet per hour)

Pressure Recovery

FIG. 12 shows the reservoir pressure for three tests. A plain orifice with 50 psig (64.7 psia) upstream would have experienced a reduction in flow at about 18 psig (32.4 psia) downstream pressure, but SNV shows regulated flow to between 35 and 40 psig (50 and 55 psia). This represents between a 77 and an 85% absolute pressure recovery. It is possible that even better pressure recovery performance could be achieved by adding radii to the nozzle throat.

Finally, we assess the converging-diverging nozzle for its performance providing pressure recovery by plotting flow versus reservoir pressure. FIG. 13 shows plots for three duty cycles. The pressure and temperature data were down-sampled and averaged to provide local derivatives for Vgas. There are initial transients that appear as erratic behavior at low pressures, followed by relatively steady flow until 20 to 30 psig. The vertical line represents the pressure at which a plain orifice would have stopped regulating effectively (about 17 psig).

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

The invention claimed is:

1. A method of regulating gas flow for an application requiring a regulated gas flow rate using a switched nozzle valve, the method comprising:

flowing the gas through the switched nozzle valve, the switched nozzle valve having a converging section, a nozzle throat, a valve element, a valve seat, and a diverging section having an exit to be in fluid communication with an application requiring gas flow control, the valve element being seatable on the valve seat;

switching the valve by an operator at a switching frequency using a pulse-width-modulation (PWM) signal generated by a microprocessor between a fully closed position where the valve element is seated on the valve seat and a fully open position where the valve element is spaced from the valve seat and the nozzle throat is unimpeded to achieve a velocity and a time-averaged flow rate of the gas without a feedback measurement;

accelerating the gas in the converging section such that the velocity of the gas reaches the speed of sound such that the flow in the orifice is in a choked condition, wherein the pressure in the orifice is at a critical pressure;

further accelerating the gas in a first part of the diverging section;

forming a shock wave at the diverging section;

abruptly decelerating the gas by the shock wave; and further decelerating the gas by a remaining portion of the diverging section downstream of the shock wave for recovering pressure loss while maintaining the speed of sound of the gas in the orifice, thereby providing gas control to the application.

2. The method according to claim 1, wherein the maximum switching frequency is at least 500 Hz.

3. The method according to claim 1, wherein the converging and diverging sections are conical.

4. The method according to claim 1, wherein the valve element is seated on the converging section.

5. The method according to claim 1, wherein the nozzle is made from brass or stainless steel.

6. The method according to claim 1, wherein the operator is a voice coil operator including a voice coil in a permanent magnetic field.

7. The method according to claim 1, wherein the operator is a solenoid operator.

8. The method according to claim 1, wherein the valve element is a ball.

9. The method according to claim 8, wherein the ball is movable axially with respect to the orifice.

10. The method according to claim 8, wherein the ball is made from sapphire.

11. The method according to claim 1, wherein the valve element is harder than the nozzle so that the nozzle conforms to the valve's precise shape and size.

12. The method according to claim 1, wherein a volume between the valve seat and the orifice is about 0.1% of a volumetric flow rate at the orifice.

* * * * *